United States Patent
Adamczak et al.

(10) Patent No.: US 12,066,069 B2
(45) Date of Patent: Aug. 20, 2024

(54) BRAKING SYSTEM WITH CENTRIFUGAL SUCTION IN THE GROOVE OF THE LINING

(71) Applicant: TALLANO TECHNOLOGIE, Boulogne Billancourt (FR)

(72) Inventors: Loïc Adamczak, Boulogne Billancourt (FR); Thibaut Le Boulaire, Boulogne Billancourt (FR)

(73) Assignee: TALLANO TECHNOLOGIE, Boulogne Billancourt (FR)

( * ) Notice: Subject to any disclaimer, the term of this patent is extended or adjusted under 35 U.S.C. 154(b) by 431 days.

(21) Appl. No.: 17/598,683

(22) PCT Filed: Mar. 27, 2020

(86) PCT No.: PCT/EP2020/058818
§ 371 (c)(1),
(2) Date: Sep. 27, 2021

(87) PCT Pub. No.: WO2020/193776
PCT Pub. Date: Oct. 1, 2020

(65) Prior Publication Data
US 2022/0186798 A1    Jun. 16, 2022

(30) Foreign Application Priority Data
Mar. 28, 2019   (FR) ...................... 1903220

(51) Int. Cl.
*F16D 65/00*   (2006.01)
*F16D 65/092*  (2006.01)

(52) U.S. Cl.
CPC ....... *F16D 65/0031* (2013.01); *F16D 65/092* (2013.01)

(58) Field of Classification Search
CPC ............... F16D 65/0031; F16D 65/092; F16D 2200/0004; F16D 55/22
See application file for complete search history.

(56) References Cited

U.S. PATENT DOCUMENTS 11,828,341 B2 * 11/2023 Maistre ................ F16D 65/092
2015/0122601 A1   5/2015 Rocca-serra
(Continued)

FOREIGN PATENT DOCUMENTS

CN      109307029      2/2019
DE      198 46 887 A1  4/2000
(Continued)

OTHER PUBLICATIONS

Search Report issued in Russian Patent Application No. 2021130074/11(063742) dated Dec. 6, 2022.
(Continued)

*Primary Examiner* — Pamela Rodriguez
(74) *Attorney, Agent, or Firm* — NIXON & VANDERHYE

(57) ABSTRACT

Disclosed is a braking system including a brake pad, the pad including a backing plate with a first face and a second face, and a lining made of friction material and fixed to the first face, the lining being delimited by a friction face, a mounting face, an inner edge, an outer edge, a rear edge, and a front edge, the lining being provided with at least one collection groove which is open to the friction face, which extends at its first end towards the inner edge and which has an opening at its second end towards the outer edge. The braking system further includes a collection system which includes a collection pipe through which air can flow, the air inlet orifice of the collection pipe being located opposite the second end, and the collection groove is open to the outer edge at its second end.

20 Claims, 4 Drawing Sheets

(56) References Cited

U.S. PATENT DOCUMENTS

| | | | |
|---|---|---|---|
| 2015/0233436 A1 | 8/2015 | Rocca-serra | |
| 2016/0003317 A1* | 1/2016 | Buxton et al. | |
| 2020/0049213 A1* | 2/2020 | Rocca-Serra | ......... F16D 65/092 |
| 2022/0178410 A1* | 6/2022 | Adamczak | ............ F16D 65/092 |

FOREIGN PATENT DOCUMENTS

| | | |
|---|---|---|
| FR | 3057040 | 4/2018 |
| JP | 2007-192268 | 8/2007 |
| KR | 1998-061265 | 10/1998 |
| KR | 10-2004-0033884 | 4/2004 |
| RU | 2 671 920 C2 | 11/2018 |

OTHER PUBLICATIONS

International Search Report for PCT/EP2020/058818, mailed Jul. 7, 2020, 5 pages.
Written Opinion of the ISA for PCT/EP2020/058818, mailed Jul. 7, 2020, 6 pages.
Notification of Opposition issued in European Patent Application No. 20713053.5 dated Feb. 19, 2024.

* cited by examiner

[Fig. 1]
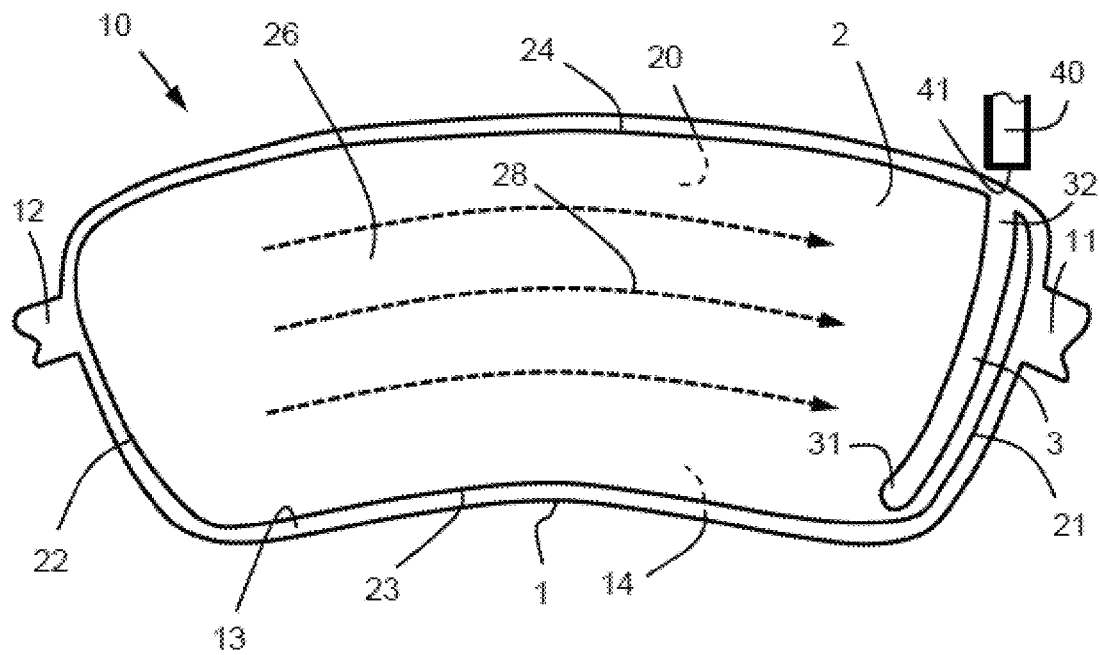
[Fig. 2]
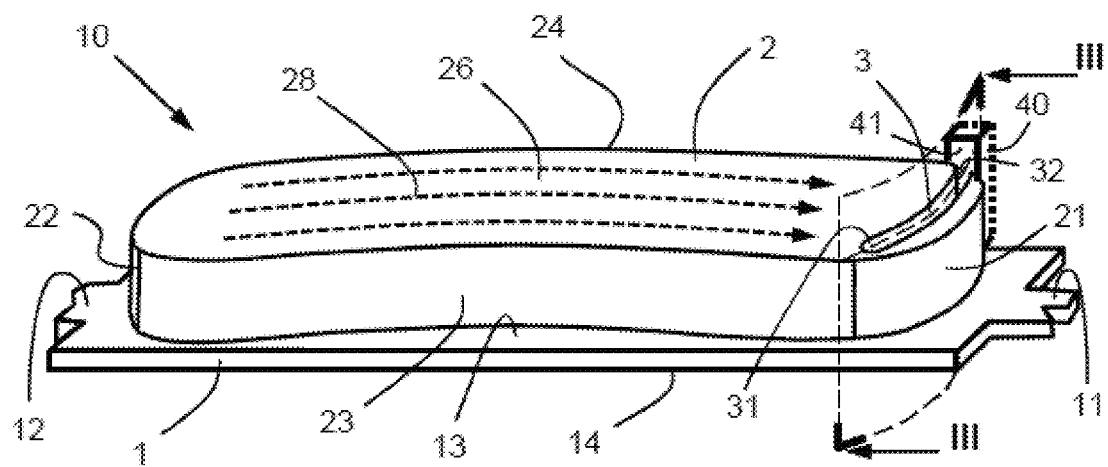

[Fig. 3]
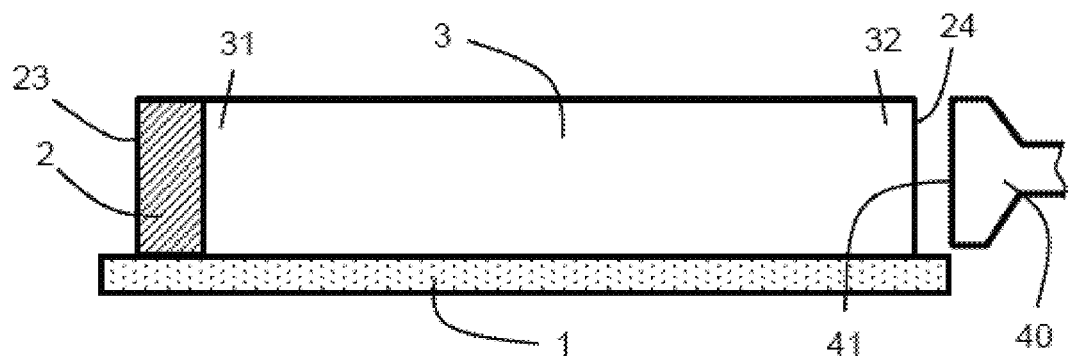
[Fig. 4]
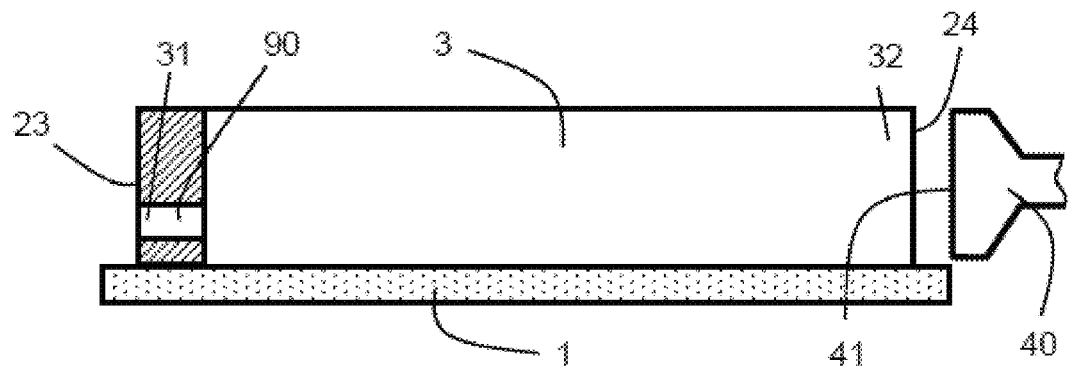

[Fig. 5]
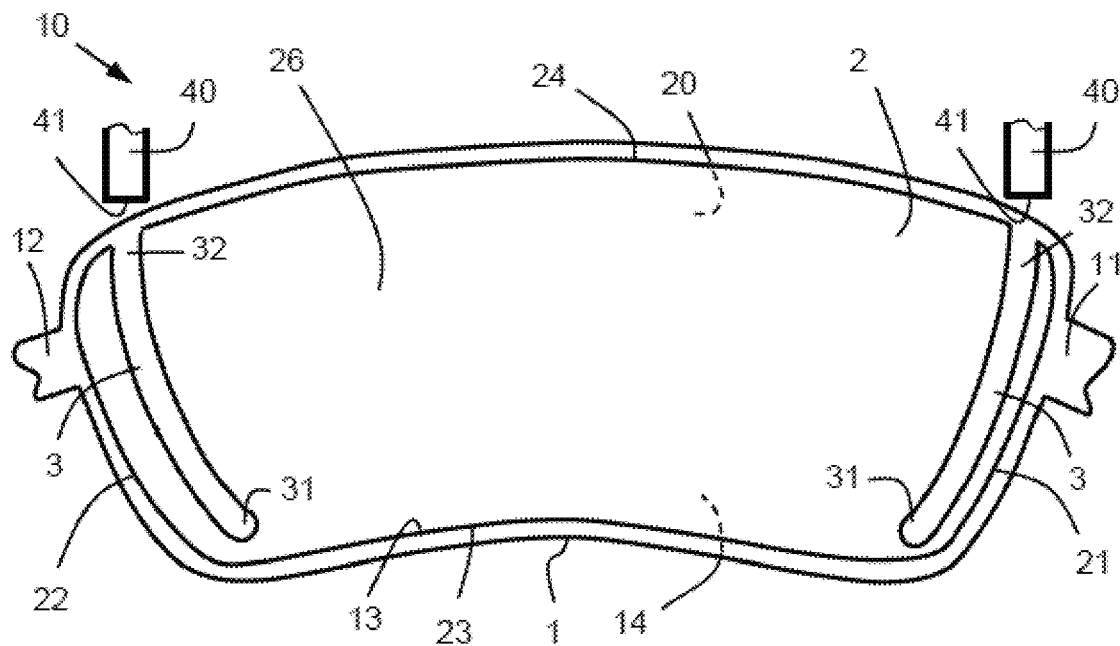
[Fig. 6]
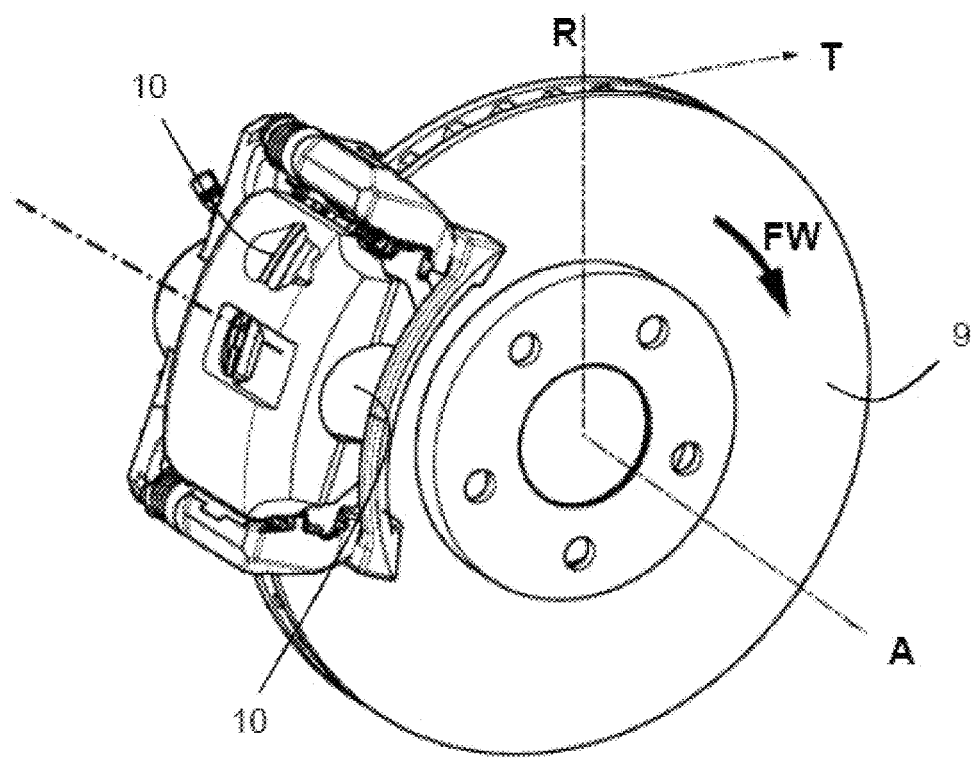

[Fig. 7] PRIOR ART
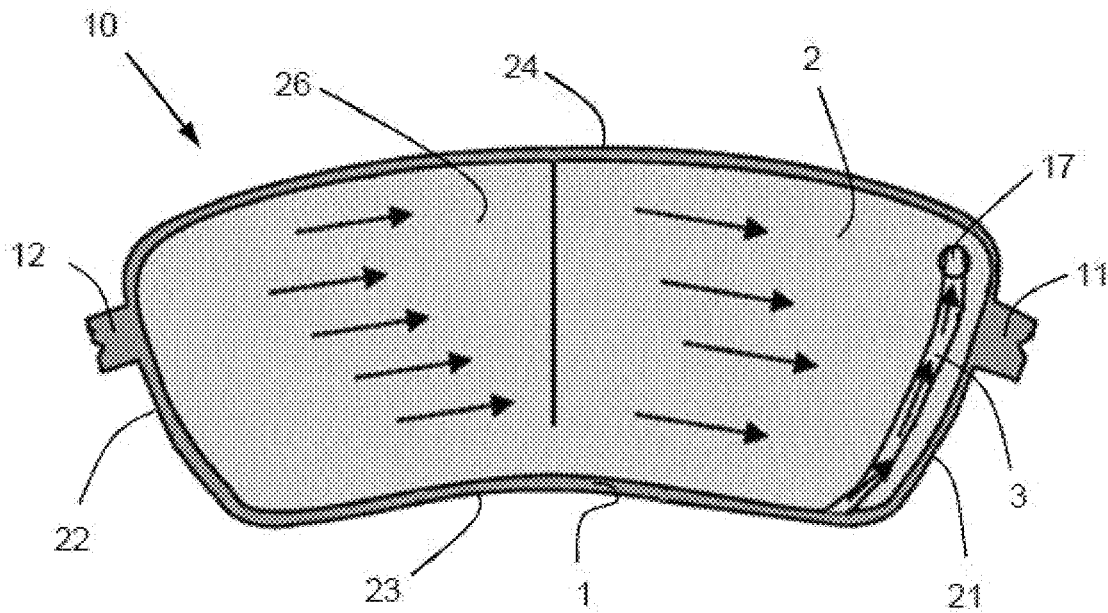
[Fig. 8] PRIOR ART
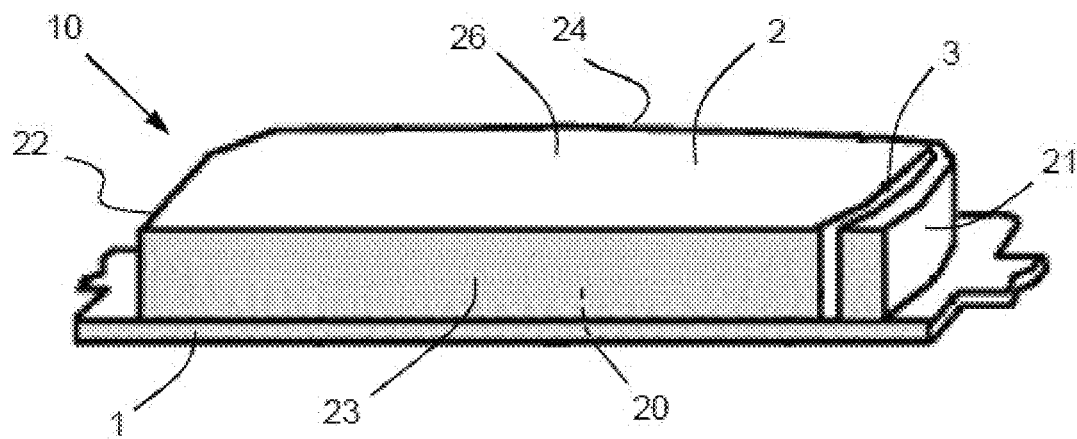

BRAKING SYSTEM WITH CENTRIFUGAL SUCTION IN THE GROOVE OF THE LINING

This application is the U.S. national phase of International Application No. PCT/EP2020/058818 filed 27 Mar. 2020, which designated the U.S. and claims priority to FR Patent Application No. 1903220 filed 28 Mar. 2019, the entire contents of each of which are hereby incorporated by reference.

BACKGROUND OF THE INVENTION

Field of the Invention

This invention relates to non-polluting braking systems, intended for use in machines comprising a rotating element whose rotation is to be slowed down, for example such as road or railway vehicles, or wind turbines.

Description of the Related Art

In such braking systems, particles and dust are emitted by friction braking, as a result of abrasion of the brake pads against the rotating element. This rotating element is for example the wheel of the vehicle, or a disc driven by the wheel of the vehicle. It is known that these particles dispersed into the ambient environment are harmful to an individual's health. In addition, the growth of electric motors for motor vehicles has reinforced the need to treat the particles and dust resulting from the abrasion of friction braking systems.

There is therefore a need to capture these particles and dust before they are released into the ambient environment.

Thus, there is the known document FR 3,057,040 which describes a braking system comprising a brake pad 10 with two ears 11, 12, this pad comprising a backing plate 1 with a first face and a second face, and a lining 2 made of friction material and fixed to the first face, the lining 2 being delimited by a friction face 26, a mounting face 20, an inner edge 23, an outer edge 24, a rear edge 21, and a front edge 22. The lining 2 is provided with at least one collection groove 3 which is open to the friction face 26, and which extends at its first end towards the inner edge 23 and has an opening at its second end towards the outer edge 34. The backing plate 1 comprises a hole 17 in fluid communication with the collection groove 3. The hole 17 is connected to a collection system by a suction pipe capable of sucking in the air and the particles and dust flowing in the groove 3.

Such a braking system is illustrated in FIGS. 7 and 8, and represents the prior art.

However, this braking system has disadvantages.

In fact, particles and dust continue to escape in undesirable amounts during the braking phases.

SUMMARY OF THE INVENTION

This invention aims to remedy these disadvantages.

The invention aims to provide a braking system for which the capture of particles and dust emitted by the lining and rotating element is optimized, and for which the construction is as simple as possible.

This aim is achieved by virtue of the fact that the braking system further comprises a collection system which comprises a collection pipe through which air is able to flow, the air inlet orifice of the collection pipe being located opposite the second end, and the fact that the collection groove has an opening onto the outer edge at its second end.

Due to these arrangements, the collection of particles and dust by the collection system is more efficient, as the air flows in the groove from the inner edge to the outer edge of the lining. Since this direction is the natural direction (without suction) of the air flow in the groove under the effect of centrifugal force, the collection of particles and dust in the collection pipe is more efficient.

Advantageously, the collection pipe is not in contact with the liner.

There is thus no generation, after the braking phase, of a more or less significant residual torque when the linings and pads move away from the rotating element.

Advantageously, the backing plate is continuous for the entire length of the at least one groove.

Thus, the manufacture of the brake pad is simplified, since it is not necessary to drill a hole in or modify the backing plate at the groove.

Advantageously, the at least one groove is located near the rear edge.

The capture of particles and dust by the groove is thus optimized, these particles and dust having a tendency to flow from the front to the rear of the lining, since this direction of flow is the direction of movement of the rotating element relative to the lining at rest.

Advantageously, the lining is provided with a second groove which is located substantially midway between the front edge and the rear edge.

The vibrational behavior of the lining-disc assembly during braking is thus improved.

Advantageously, the lining is provided with an additional groove located near the front edge.

The system according to the invention thus operates equally efficiently in both directions of rotation of the rotating element relative to the lining, which is advantageous for vehicles which must brake in both directions, such as railway vehicles.

Advantageously, the collection system comprises a suction mechanism which is able to suck the air from the at least one collection groove into the collection pipe.

The collection of particles and dust in the collection pipe is thus more efficient.

BRIEF DESCRIPTION OF THE DRAWINGS

The invention will be better understood and its advantages will be more apparent upon reading the following detailed description of embodiments represented as non-limiting examples. The description refers to the accompanying drawings, in which:

FIG. 1 is a top view of a brake pad of a braking system according to the invention, FIG. 2 is a perspective view of a brake pad of a braking system according to the invention, FIG. 3 is a section view following the collection groove of a brake pad of a braking system according to the invention, along line III-Ill of FIG. 2, FIG. 4 is a section view following the collection groove of a brake pad in a variant of a braking system according to the invention, FIG. 5 is a top view of a brake pad of a braking system according to another embodiment of the invention, FIG. 6 is a perspective view of a braking system according to the invention, mounted on a rotating disc, FIG. 7, already described, shows a top view of a pad according to the prior art, FIG. 8, already described, shows a perspective view of a pad according to the prior art.

DESCRIPTION OF THE PREFERRED EMBODIMENTS

The invention relates to a braking system which comprises a brake pad 10 of a brake intended for braking a rotating element 9 of a machine. The invention is described below in the case where the machine is a road vehicle in which this brake is a disc brake. However, the invention applies equally well to the case of a brake pad in a shoe brake which rubs on a wheel, used in vehicles on rails (railway vehicles), or to the case of a brake pad used in any other industrial machine (for example in the case of a wind turbine). In all cases, the braking of a rotating element of the machine is achieved by friction of the brake pad on this rotating element during its rotation.

In a disc brake, braking is achieved by friction between a disc (which is the rotating element 9) which is integral with a wheel of the vehicle, and two brake pads 10 which press against this disc 9, one on each side in order to sandwich it. The disc 9 extends in a main plane and has as its axis of rotation an axis A which is perpendicular to this main plane.

Each of the pads 10 extends in this main plane, such that the thickness of a pad 10 extends along the axis of rotation A.

The disc 9 rotates about the axis of rotation A with a direction of rotation FW, which defines a tangential direction T which is tangent to the circumference of the disc 9 and oriented in the direction of rotation FW, and a radial direction R orthogonal to the axis of rotation A in the main plane of the disc 9.

These elements are indicated in FIG. 6, which shows the braking device mounted on the disc 9.

In the description which follows, the terms "inner" and "outer" denote the edges or areas of the brake pad 10 (or of its components) which are located respectively closest to and furthest from the axis of rotation A, and the terms "front" and "rear" denote the edges or areas of the brake pad 10 (or of its components) which are located respectively upstream and downstream relative to the flow direction of the particles 28 emitted by the lining 2 (described below) which is also the direction of rotation FW.

As illustrated in FIGS. 1 and 2, a brake pad 10 comprises a backing plate 1, also called a backplate. The backing plate 1 is for example made of a metal. The backing plate 1 is a flat plate of substantially constant thickness (for example between 3 and 7 mm), its general shape in its main plane being trapezoidal with straight or curved edges.

The backing plate 1 comprises a first face 13 on which is fixed a lining 2, and a second face 14 which is opposite to the first face 13.

The backing plate 1 also comprises two ears (11, 12), which extend in the plane of the backing plate 1 at two lateral ends thereof, and which serve to hold and guide the pad 10.

The brake pad 10 further comprises a lining 2 made of a friction material. For example, this material is a material called "ferodo".

The lining 2 is delimited by a friction face 26 ("rubbing" face), a mounting face 20 opposite to the friction face 26 (these two faces being parallel) and fixed to the backing plate 1, an inner edge 23, a outer edge 24, a rear edge 21, and a front edge 22. The outer 24, rear 21, and front 22 edges are convex or rectilinear, the inner edge 23 is concave or rectilinear.

The friction face 26 gradually approaches the backing plate 1 as the lining 2 wears away. The thickness of the lining 2 (measured along the axis of rotation A) therefore decreases as it wears.

During operation, the lining 2 (and the rotating element 9) releases particles 28 due to friction between the lining 2 and the disc 9. The paths of the particles 28 along the friction face 26 are represented by dotted lines in FIGS. 1 and 2.

The lining 2 is provided with at least one collection groove 3 that is open to the friction face 26.

The groove 3 has a first end 31 and a second end 32. The groove 3 is extended at its first end 31 at the inner edge 23, and has an opening at its second end 32 onto the outer edge 24.

"The groove 3 extends at its end towards an edge" is understood to mean that this end of the groove 3 is located in proximity to the edge. This end of the groove can either have an opening (to the backing plate or to that edge), or not.

"The groove 3 has an opening at its end towards an edge" is understood to mean that the groove 3 has a communicating opening at this end in proximity to the edge, in other words either by extending through the backing plate 1, or by opening directly onto this edge.

In all cases, the groove 3 is open at this end, away from the friction face 26.

According to the invention, the groove 3 is open at its second end 32, directly onto the outer edge 24.

The depth of the groove(s) 3 is for example equal to the height of the lining 2, meaning that the bottom of the groove 3 is coincident with the first face 13 of the backing plate 1. Alternatively, the depth of the groove(s) 3 is less than the height of the lining 2.

For example, the collection groove(s) 3 has a constant rectangular cross-section from its upstream end to its downstream end, and is therefore of constant thickness.

For example, the collection groove 3 is located near the rear edge 21. This configuration makes it possible to collect more efficiently in this groove 3 the particles/dust resulting from braking, given that the particles naturally flow from the front to the rear of the lining 2. In fact, this direction of flow is the direction of movement of the rotating element 9 relative to the lining 2 at rest.

Optionally, the lining 2 further comprises a second collection groove 3 which is located substantially midway between the front edge 22 and the rear edge 21.

This position of the second collection groove 3 makes it possible to minimize undesirable vibrations of the lining 2.

The braking system comprises a collection system which comprises a collection pipe 40 through which air is able to flow. The collection pipe 40 has an air inlet orifice 41 which is located opposite the second end 32 of the groove 3, as illustrated in FIGS. 1 to 4. The air flowing in the groove 3 enters the collection pipe 40 through this inlet orifice 41.

Advantageously, the collection system comprises a suction mechanism (not shown) which is able to suck in air from the groove 3 into the collection pipe 40. The collection of particles/dust (from the groove 3) into the collection pipe 40 is thus more efficient.

This configuration also has the advantage that the flow of air forced by the suction mechanism of the collection system takes place in the same direction as the natural flow of air in the groove 3. In Indeed, under the influence of centrifugal force, the air flows naturally from the first end 31 to the second end 32. The collection system is therefore more efficient.

As illustrated in FIGS. 1 to 3, the groove 3 does not open onto the inner edge 23. A wall formed by the lining 2 therefore separates the first end 31 from the inner edge 23. The manufacture of the lining 2 is thus simplified.

Advantageously, the groove 3 also has no opening through the backing plate 1. In this case, the backing plate 1 is continuous for the entire length of the groove 3, meaning it does not have a hole enabling air to travel from the groove 3 through the backing plate 1. The manufacture of the brake pad is then simplified, since it is not necessary to modify the backing plate 1 (for example by drilling a hole) at the groove 3.

Alternatively, at the inner edge 23 the groove 3 is shaped as a channel 90 which places the remainder of the groove 3 in communication with the inner edge 23 such that the groove 3 opens onto the inner edge 23, as shown in FIG. 4. Thus, this channel 90 has a continuous side wall surrounded by the lining 2, its first end opening into the rest of the groove 3 and its second end (which is thus the first end 31 of the groove 3) opening onto the inner edge 23. This configuration improves the air flow in the groove 3, including as the lining 2 wears away. Advantageously, the channel 90 is as close as possible to the backing plate 1, in order to maximize the working thickness of the lining 2 during operation.

The channel 90 is of constant cross-section, for example of circular cross-section. Alternatively, the channel 90 has a cross-section at its first end which is greater than its cross-section at its second end, so that air more easily enters the groove 3 through the channel 90.

Advantageously, in all embodiments, there is no contact of the collection pipe 40 with the lining 2. Thus, after the braking phase, there is no generation of a more or less significant residual torque when the linings 2 and the backing plates 1 move away from the rotating element, this residual torque being generated by the fact that a pipe is in contact with the lining 2 or backing plate 1.

In this configuration, the collection pipe 40 is located outside the area of displacement of the backing plate 1 (the amplitude of this displacement resulting from wear of the lining 2 over the lifetime of the brake pad 10) so that the collection pipe 40 is not in contact with the lining 2 or the backing plate 1 during the entire service life of the brake pad 10.

In this configuration, advantageously, the inlet orifice 41 of the collection pipe 40 is furthermore located as close as possible to the outer edge 24, so as to maximize the passage of air between the groove 3 and the collection pipe 40.

FIG. 5 illustrates the case where the lining 2 is provided with an additional groove 3 which is located near the front edge 22, in addition to the first groove 3 located near the rear edge 21. The lining 2 then comprises two grooves 3.

The collection system therefore comprises a first collection pipe 40 into which air from the first groove 3 can flow, and a second collection pipe 40 into which air from the additional groove 3 can flow. Each of these pipes is connected to an element which is part of the collection device.

Advantageously, the collection system comprises a suction mechanism which is able to suck the air from the grooves 3 into each of the collection pipes 40.

This double-groove 3 configuration is suitable for vehicles which are subjected to braking in both directions, such as railway vehicles. Indeed, in this case the particles 28 released by friction of the lining 2 on the rotating element can flow either from the front edge 22 to the rear edge 21, or from the rear edge 21 to the front edge 22. The presence of two grooves 3 makes it possible to capture the particles in a groove 3, regardless of the braking direction of the vehicle.

According to yet another embodiment, the lining 2 comprises another groove 3 (called the second groove) which is located substantially midway between the front edge 22 and the rear edge 21, this second groove 3 having been described above.

The additional groove 3 which is located near the front edge 22 is then a third groove 3. This embodiment thus makes it possible both to minimize undesirable vibrations of the lining 2 and to capture particles in a groove 3 regardless of the braking direction of the vehicle.

Advantageously, the collection system comprises a suction mechanism which is capable of sucking air from the grooves 3 into each of the collection pipes 40.

In general, the suction mechanism comprises an element capable of sucking in air through the collection pipe 40. For example, this element is a pump. For example, this element is located downstream of the collection pipe 40 in the natural direction of the air flow. Advantageously, this element comprises a filter.

Alternatively, the element capable of sucking in air through the suction pipe 40 is a unit located on the path of the air in the suction pipe 40, downstream of the inlet orifice 41, and which is designed with an upstream inlet of smaller cross-section than its downstream outlet.

The invention claimed is:

1. Braking system comprising a brake pad, said pad comprising a backing plate with a first face and a second face, and a lining made of friction material and fixed to said first face, the lining being delimited by a friction face, a mounting face, an inner edge, an outer edge, a rear edge, and a front edge, said lining being provided with at least one collection groove which is open to the friction face, which extends at the at least one collection groove's first end towards said inner edge and which has an opening at the at least one collection groove's second end towards said outer edge, said braking system further comprising a collection system which comprises a collection pipe through which air is able to flow, an air inlet orifice of said collection pipe being located opposite said first end, wherein said collection groove has an opening onto said outer edge at the collection groove's second end.

2. The braking system according to claim 1, wherein the collection pipe is not in contact with said lining.

3. The braking system according to claim 2, wherein said backing plate is continuous for the entire length of said at least one groove.

4. The braking system according to claim 2, wherein said at least one groove has an opening at the at least one groove's first end towards said inner edge.

5. The braking system according to claim 2, wherein said at least one groove is located near said rear edge.

6. The braking system according to claim 2, wherein said collection system comprises a suction mechanism which is able to suck the air from said at least one collection groove into said collection pipe.

7. The braking system according to claim 1, wherein said backing plate is continuous for the entire length of said at least one groove.

8. The braking system according to claim 7, wherein said at least one groove has an opening at the at least one groove's first end towards said inner edge.

9. The braking system according to claim 7, wherein said at least one groove is located near said rear edge.

10. The braking system according to claim 7, wherein said collection system comprises a suction mechanism which is able to suck the air from said at least one collection groove into said collection pipe.

11. The braking system according to claim 1, wherein said at least one groove has an opening at the at least one groove's first end towards said inner edge.

12. The braking system according to claim 11, wherein said at least one groove is located near said rear edge.

13. The braking system according to claim 11, wherein said collection system comprises a suction mechanism which is able to suck the air from said at least one collection groove into said collection pipe.

14. The braking system according to claim 1, wherein said at least one groove is located near said rear edge.

15. The braking system according to claim 14, wherein said lining is provided with a second groove located substantially midway between said front edge and said rear edge.

16. The braking system according to claim 15, wherein said lining is provided with an additional groove located near said front edge.

17. The braking system according to claim 15, wherein said collection system comprises a suction mechanism which is able to suck the air from said at least one collection groove into said collection pipe.

18. The braking system according to claim 14, wherein said lining is provided with an additional groove located near said front edge.

19. The braking system according to claim 14, wherein said collection system comprises a suction mechanism which is able to suck the air from said at least one collection groove into said collection pipe.

20. The braking system according to claim 1, wherein said collection system comprises a suction mechanism which is able to suck the air from said at least one collection groove into said collection pipe.

* * * * *